May 6, 1969 S. P. WEISBROD 3,443,121
TIME PROPORTIONING TEMPERATURE CONTROL SYSTEM
Filed Dec. 20, 1965

INVENTOR.
STEPHEN P. WEISBROD

INVENTOR.
STEPHEN P. WEISBROD
BY Richard H. MacCutcheon
Atty.

United States Patent Office 3,443,121
Patented May 6, 1969

3,443,121
TIME PROPORTIONING TEMPERATURE CONTROL SYSTEM
Stephen P. Weisbrod, Mayfield Heights, Ohio, assignor to API Instruments Company, Chesterland, Ohio, a corporation of Ohio
Filed Dec. 20, 1965, Ser. No. 515,116
Int. Cl. H01h 35/00
U.S. Cl. 307—117                       5 Claims

ABSTRACT OF THE DISCLOSURE

A time-on proportioning control system has a comparator such as a meter relay, output from which is taken to a second comparator for comparing with a saw-tooth wave. The result is applied to a relaying device for controlling "power-on" as a percentage of each saw-tooth cycle.

---

This invention relates to improvements in eletcrical control systems and devices and has particular significance in connection with apparatus in which the proportion of the time for which power is applied is varied in accordance with a varying full time signal, for example for temperature control.

In the field of automatic process control it has long been known that maximum economy in controller design results if the power to the process is varied between two discrete values, rather than over a very large or infinite number of values. Thus the typical "thermostat" simply turns the power on and off when the sensed temperature falls below or rises above the respective two threshold values characteristic of such simple devices. More expensive and complicated controllers of this basically simple type provide for adjustment of the two thresholds and thus for reducing the difference between the thresholds.

Users of "thermostat" controls find that as the thresholds are brought closer together, reducing the "dead band," generally the process temperature is held more constant—that is, better control is achieved—until the process begins to "hunt" or "cycle," a phenomenon well known to those familiar with the control art. It has been found that still better control can be provided if, when the controller calls for more power, it obtains only a little more than just enough to produce the desired signal (temperature, in the case of thermostats), and if, when the controller calls for less power, it obtains only a little less than just enough to produce the desired signal. There are many disadvantages to helping a thermostat in this way, chiefly added cost of the manual adjustments and reduced automation as the load and desired temperature are changed, but the controller itself retains the simplicity of a thermostat and the economy of two value output control (often in the form of a pair of contacts on a relay).

More recently the concept of "time-proportioning" control has been found useful. If the two-value kind of control described above is forcefully and repetitively cycled between the two values rapidly enough, the time constants of the process will prevent the condition sensor from responding significantly to any one period during which either more or less power is supplied than is required to maintain the process at the desired sensed signal value. The essential matter of technical interest becomes not "when is it calling for more and when for less power?" but "what percentage of the time is it calling for power?"

Thus it is to the problem of providing improved time-proportioning control that my invention is addressed. I have devised a completely automatic time-proportioning controller which is capable, at minimum cost, of providing control action approaching or exceeding the capabilities of far more expensive and complex proportional control devices, even when used for the control of large amounts of power. Simultaneously my controller is capable of providing independence of the various adjustments, for maximum operating convenience and adaptability to various kinds of processes.

While manually adjusted time-proportioning is not novel it is not very useful either, and the automatic equipment for time-proportioning has heretofore usually been inordinately expensive and complex.

It is an object of the present invention to provide simple and inexpensive means for overcoming the above mentioned difficulties.

Other objects and advantages will become apparent and the invention may be better understood from consideration of the following description taken in connection with the accompanying drawings, in which.

Figure 1:
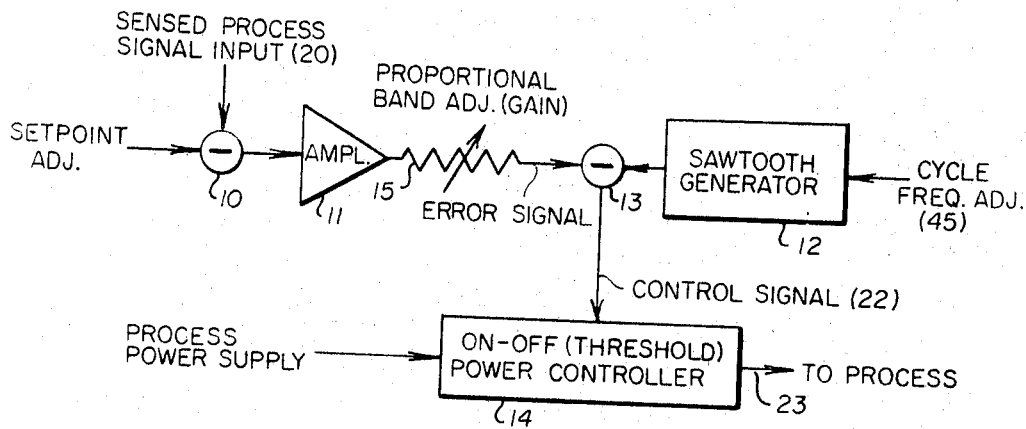
FIG. 1 is a simplified block diagram illustrating basic principles of my invention.

Referring first to FIG. 1, it is seen that a signal sensed in a process is compared with the manually adjusted desired value of that signal at a location 10. Either the incoming signal may be amplified first, or, as illustrated, the result of the comparison may be amplified at 11. The resultant, or "error" signal, has a value proportional to the divergence between the sense and desired signals, and may be zero when the two agree. For convenience the constant of proportionality should be adjustable, and the adjustment of gain is called "Proportional Band Adjustment" because the terminology is derived from conventional proportional controllers. An independent circuit at 12 provides a linear sawtooth signal which is compared, at 13, with the error signal to produce a control signal. The D.C. level of the control signal may conveniently vary inversely with the resultant signal. A final controller 14 turns the process power up or down as the control signal rises above or falls below the threshold at 14 causing the desired time-proportioning behavior. Voltage adjustment may be provided where desired, as by an adjustable resistor 15.

Figure 2:
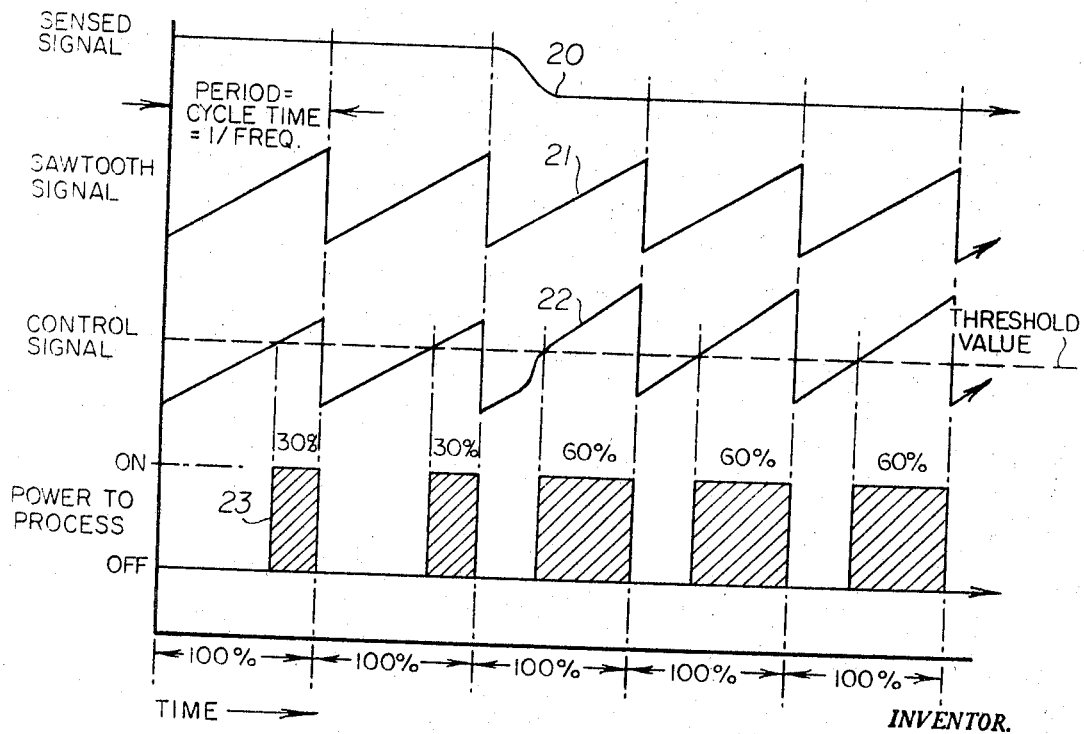
FIG. 2 is a graphical representation of the various signals, and of controller output power, with respect to time.

A temperature control example of operation is shown by FIG. 2. During the time shown, a sensed signal 20 drops. Meanwhile the saw-tooth generator's signal 21 proceeds independently. The drop in sensed signal 20 is assumed (when subtracted from the setpoint) to cause the error signal to increase, so the control signal 22 rises. "Curve" 23 shows that for the example selected, then, before the sensed signal 20 fell the power was on approximately 30% of the time, whereas following the fall the power is on approximately 60% of the time, which will tend to return the sensed signal to its previous value. If the sensed signal had fallen farther, for example, the percentage of "on-time" might have risen to 90% or even 100%. Thus, there is an infinite number of time-proportion settings corresponding to an infinite number of error signal sizes, and a very desirable object has been achieved in that the *average* output signal is proportional to the error signal, even though the final control element (e.g., at 14) is merely capable of being "on" or "off."

While it is not intended that the invention be considered as so limited, the present invention is particularly advantageous when used in conjunction with a meter-relay, which has well-known advantages including low cost, simplicity, ease of adjustment of automatic operation, and continuous presentation of measured value and setpoint.

Figure 3:
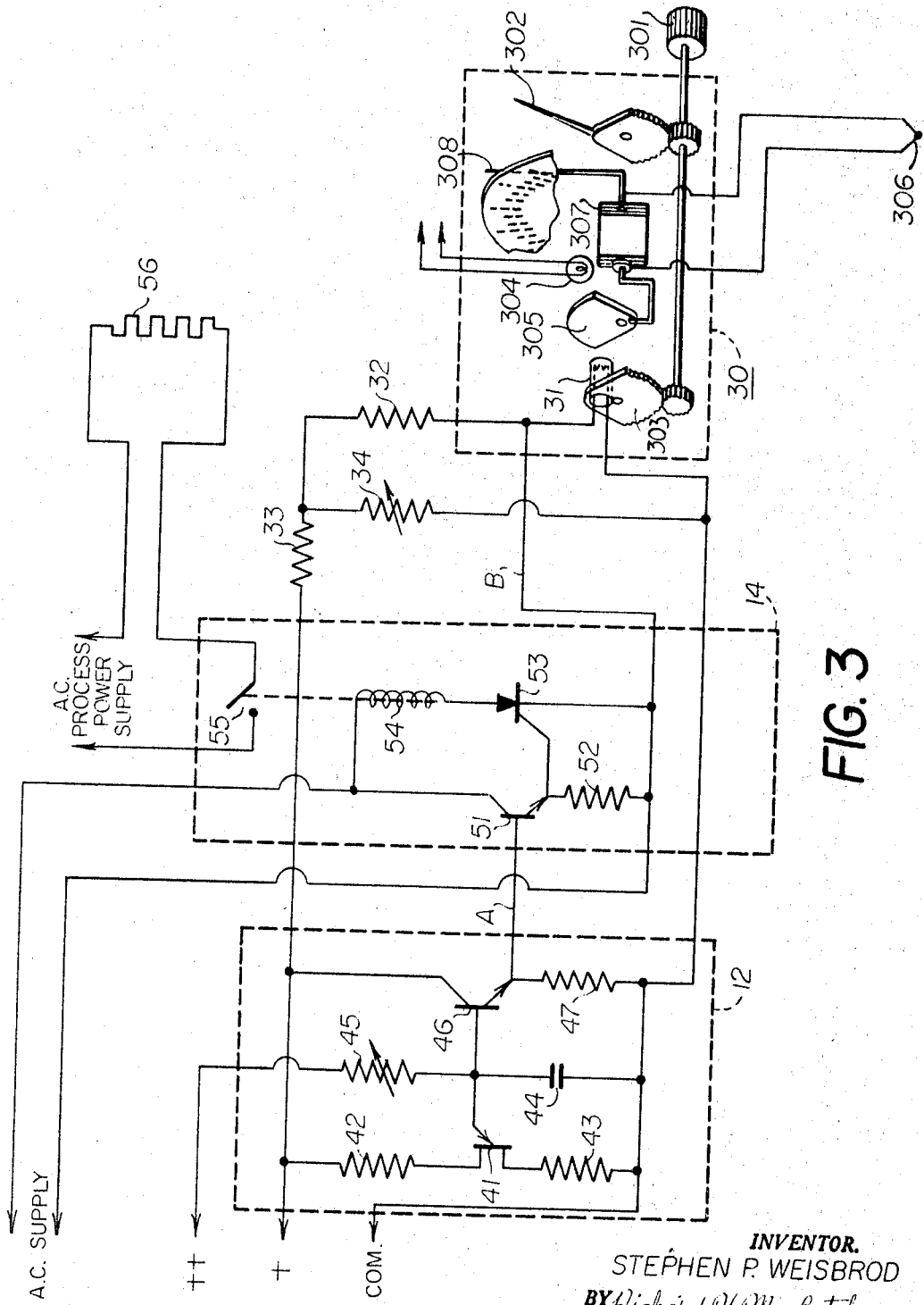
FIG. 3 is a schematic diagram illustrating a preferred embodiment of my invention.

In FIG. 3 the signal from the process is presumed to be amplified and subtracted from a setpoint by a meter-relay 30, comparable to subtractor 10 in FIG. 1. There are many well-known adjustable setpoint meter-relays, as well as other equivalents, suited for use with my invention, but a preferred device is "contactless," and for the purpose of this description disclosure it may be assumed that meter-relay 30 is of the type fully disclosed in co-pending patent application of Geo. E. Hammond, Ser. No. 380,203, filed July 6, 1964, and assigned to the assignee of the present invention. In such a meter a knob 301 is used for manually adjusting a setpoint indicating pointer 302 and a rotatable segment 303 carrying a photocell 31 illuminated by a lamp 304 except when a flag 305 intervenes. Sensed signal current derived as from a thermocouple 306 energizes a coil 307 which reacts with a permanent magnet (not shown) to rotate both flag 305 and a sensed signal pointer 308 preferably about the same axis as 302 and 303 are rotated for setpoint adjustment. The error signal occurs as varying resistance in the radiation sensitive coil 31, connected to a source of regulated voltage in series with a dropping resistor 32. The supply voltage of this combination, and hence the change in output voltage for a given change in light intensity, or gain, may be made adjustable with a supply series resistor 33 and an adjustable shunt resistor 34.

In FIG. 3 a suitable saw-tooth wave generator circuit is shown at block 12 to comprise a unijunction transistor 41 provided with base resistors 42 and 43 between the power supply busses. The emitter of the unijunction transistor 41 is connected to a capacitor 44 (whose other terminal connects to the common supply lead) and to an adjustable resistor 45 of relatively high value, the other terminal of which preferably is connected to a relatively high voltage supply. The junction of the emitter, the capacitor 44 and resistor 45 are connected to the base of a conventional emitter follower transistor 46 having an emitter load resistor 47.

In FIG. 3 section 14 is again the suitable threshold power control, on-off, circuit. Preferably, and as shown, this circuit is supplied with A.C. power at line frequency. An emitter follower transistor 51 has a load resistor 52 and is connected to the gate of a silicone controlled rectifier 53. SCR 53 controls the flow of current each half cycle through the coil 54 of an output relay having power contacts 55 connected in series with a source of process power, to control it, e.g., as fed to a load such as a process heater 56.

In operation, capacitor 44 is charged through the high value adjustable resistor 45 at a rate governed by the selected value of resistor 45. When the voltage reaches a threshold value characterized by the particular unijunction transistor 41 and its base resistors 42 and 43, and the actual supply voltage, the emitter conducts the capacitor's charge to ground, whereupon the cycle starts once again, producing a saw-tooth voltage like that shown at 21 in FIG. 2. The emitter follower circuit provides high input impedance and current amplification to preserve the linearity of the saw-tooth waveform. Thus the output of section 12 at A is a linear saw-tooth voltage whose frequency may be selected by adjustment of resistor 45.

At B is found a voltage proportional to the error signal developed by meter relay 30, whose gain may be selected by adjustment of resistor 34. Since the polarity of voltages at A and B is positive with respect to the common power supply bus, the voltage between A and B is the instantaneous difference between these two signal sources.

In section 14, in each half-cycle whenever the upper A.C. supply lead is positive with respect to the lower, the circuit has a potentiality for conducting current through relay coil 54. This potentiality will be realized, however, only for those half-cycles during which the voltage applied to the emitter of transistor 51 exceeds a threshold governed by the components of the circuit 14. The voltage applied to the emitter of transistor 51 is the difference voltage A–B. If the voltage from circuit 30 were, for example, very low (photocell brightly illuminated), then each time the saw-tooth voltage starts upward it will almost immediately exceed the threshold of circuit 14 each half-cycle. Generally, the timing constants may be selected so that at least 25 A.C. alternations occur per saw-tooth cycle, although very often they may be of the order of 200 or even 1000 alternations per saw-tooth cycle causing the relay contacts 55 to remain closed essentially all of the time. However, as the voltage at B becomes larger (due to reduced cell illumination) the saw-tooth wave must progress farther before the threshold of circuit 14 is exceeded each half-cycle, and relay contacts 55 are thus closed a smaller proportion of the time. When the voltage at B is very high, the threshold may never be exceeded, and contacts 55 may remain open throughout the saw-tooth wave cycle.

There is thus provided a device or system of the class described and offering the advantage that it is or can be completely automatic in operation and capable of approaching or exceeding the capabiilties of far more expensive and complex prior art arrangements even when used for the control of large amounts of power. Simultaneously, a system according to the invention provides independence (for maximum operating convenience and adaptability to various kinds of processes) of the various manual adjustments, e.g., as illustrated as:

(1) An adjustment means (resistor 45 in FIG. 3) for independently controlling cycle time (=1/saw-tooth c.p.s., as defined in FIG. 2);

(2) An adjustment means (resistor 15 in the one line diagram of FIG. 1, or resistor 34 in FIG. 3) for independently controlling proportional band;

(3) An adjustment means (knob 30k of the meter relay 30 in FIG. 3) for independently controlling setpoint adjustment.

While I have illustrated and described a particular embodiment and applied the invention to heat control, the arrangement is equally operable for other control purposes and circuits, and various modifications may obviously be made without departing from the true spirit and scope of the invention.

I claim:

1. Time proportioning control for a system having a power line supply for a process, a process condition sensor and a process condition corrector, said control comprising:

a first comparator means which is connected to be responsive to a signal from said sensor and which has a setpoint, said first means being for comparing said signal with a desired value as determined by the setpoint and thereupon producing a first resultant signal, a generator of a saw-tooth signal which generator is operable completely independent of any frequency characteristic of the power line and which generator has a frequency lower than approximately 2.4 cycles per second, a second comparator means including circuitry connected to the first comparator means and to the saw-tooth signal generator, said second means being for comparing said first means resultant signal with said saw-tooth signal to produce a second resultant signal, and a process power supply controller means having a characteristic threshold and for regulating said process power supply in a "Proportional Time On" sense, said controller means being connected to the second comparator whereby to operate responsive to the second resultant signal whenever during any saw-tooth cycle said second resultant signal exceeds the characteristic threshold of the said controller means.

2. Time proportioning control as in claim 1 further characterized by the first comparator means comprising an electro-magnetic-mechano-optic-electrical instrument means providing a setpoint adjustment and which receives signals from the sensor, compares them with said setpoint adjustment, and produces an electrical resultant signal representative of the difference.

3. A control as in claim 1 further characterized by manually adjustable means for adjusting gain of the resultant signal as received from the first comparator and applied to the second comparator.

4. A control as in claim 2 further characterized by an adjustment means for independently controlling cycle time of said saw-tooth signal generator, and an adjustment means for independently controlling proportional band,
whereby to provide independence of various manual adjustments while the control automatically biases combined outputs in or out of an adjustable proportioning band on one side of which the final output is on, on the other side of which the final output is off, and within which proportional band the proportion of time-on to time-off is proportional to the deviation from setpoint in said meter relay.

5. A control as in claim 1 further characterized by the first comparator being a meter relay,
the second comparator comprising an arrangement of subtractive connections leading in part from said saw-tooth generator and in part from said meter relay and leading to said third comparator,
and the process power supply controller means comprising a silicon controlled rectifier whose threshold is determined by its own construction and by that of associate circuitry and by the voltages and currents applied and developed during connection with said second comparator's subtractive connections.

References Cited

UNITED STATES PATENTS

| | | | |
|---|---|---|---|
| 3,036,188 | 5/1962 | Ditto | 317—132 X |
| 3,180,974 | 4/1965 | Darling | 219—497 |
| 3,231,719 | 1/1966 | De Viney et al. | 219—497 |
| 3,300,622 | 1/1967 | Swain | 219—497 |
| 3,301,482 | 1/1967 | Bullen | 236—46 |
| 3,325,716 | 6/1967 | Gomi | 321—18 X |

ROBERT K. SCHAEFER, *Primary Examiner.*

T. B. JOIKE, *Assistant Examiner.*

U.S. Cl. X.R.

219—497; 236—46; 317—132, 148.5